March 25, 1969  R. RUPRECHT ET AL  3,434,363

SHEAVE

Filed June 12, 1967

INVENTORS
ROBERT RUPRECHT
KURT HEYDLAUF
HERBERT BRAUN

BY

ATTORNEY even # United States Patent Office 3,434,363
Patented Mar. 25, 1969

3,434,363
SHEAVE
Robert Ruprecht, Aichelberg, Kreis Esslingen, Kurt Heydlauf, Stuttgart-Zuffenhausen, and Herbert Braun, Bissingen (Enz), Germany, assignors to Ernst Heinkel Aktiengesellschaft, Stuttgart-Zuffenhausen, Germany
Filed June 12, 1967, Ser. No. 645,165
Claims priority, application Germany, June 14, 1966, H 59,664
Int. Cl. F16h 55/52
U.S. Cl. 74—230.17
12 Claims

ABSTRACT OF THE DISCLOSURE

An adjustable sheave having a shaft member on which a flange is mounted. A movable flange member is arranged on the shaft member with freedom of axial movement relative thereto and comprises an elongated hub which surrounds a portion of the shaft member coaxially and with clearance. Coupling means engages the movable flange member at least in the region of the respective axial ends of the hub and thus serves to center the latter with reference to the shaft and concomitantly couples the flange member to the shaft member with freedom of axial movement relative thereto while preventing relative rotation of the members.

Background of the invention

The present invention relates to a motion-transmitting arrangement in general, and more particularly to a sheave. Still more specifically, the present invention relates to an adjustable sheave.

Continuously-variable drive arrangements are well known, and are particularly utilized in certain types of power tools, including sawing machines, drilling machines, and the like where the power to be transmitted is relatively small. Lately, they are also being used in applications where the power to be transmitted is extremely small. Arrangements of this type utilize V-belts which pass around a sheave arranged on a shaft from which or to which power is to be transmitted. In order to permit continuous power variation, it is necessary that such sheaves be adjustable, and they therefore comprise two flanges of which one is fixed with the shaft while the other is axially movable thereon. Between themselves, these two flanges define a V-shaped groove in which the V-belt is received. To achieve continuous variation of the drive arrangement, the movable flange shifts away from the fixed flange to a greater or lesser degree and the V-belt is thus supported at a greater or at a smaller distance from the shaft by engagement with the opposed surfaces of the two flanges. Of course, the movable flange must be able to perform only axial movements, and must be secured against rotation relative to the shaft member and the fixed flange.

Shifting of the movable flange in axial direction is intermittent and takes place at intervals which are not usually very close together because the variation in the power transmission does not ordinarily take place with great frequency. This does not mean, however, that the movable flange remains perfectly stationary during the periods of time when the power transmission is constant. On the contrary, the movable flange undergoes continual small axial movements which are caused not by adjustment in the position of the movable flange in order to vary the transmission of power, but rather by the fact that the width of the V-belt varies slightly from point to point thereof. Such variations are to be found even in new belts because it is not practicable to control the manufacture of such belts to such an extent that relatively minor variations in the width of the belt are completely precluded. As the belt ages, these width variations become accentuated, due to wear of the belt and also due to the inevitable stretching which occurs in the material of the belt. Thus, these continual axial movements of the movable flange become even more pronounced as the age of the belt being used with the adjustable sheave increases.

Now it is well known that as a result of the continual friction between the belt and the flanges on the one hand, and between the movable flange and the shaft or the bearing which secures it to the shaft on the other hand, minute particles of material become loosened from the belt as well as from the movable flange and/or the shaft or bearing. Moisture and contaminants in the ambient atmosphere soon combine with these particles and form a layer which at best prevents proper axial movements of the movable flange and which, because the proper formation of a film of lubricant between the movable parts of the sheave is not possible as a result of the smallness of the axial movements of the movable flange, can result in a destruction of important surface portions of the movable flange.

Attempts have been made to overcome this problem by providing serially arranged ball bearings intermediate the hub of the axially movable flange and the surface of the shaft member on which the flange moves. While these arrangements do not preclude the formation of the aforementioned layer of particulate material and contaminants, they nevertheless assure proper operation of the sheave because the layer is distributed between the balls of the ball bearing and is thus incapable of caking solidly at any one point and causing the difficulties described above. The disadvantage of these prior-art arrangements, however, is the fact that they are rather expensive and necessitate an economic and a technological expenditure—namely use of special steels for the shaft member, provision of the ball bearings, and precision treatment of various surfaces—which precludes the use of such prior-art arrangements precisely for those applications where adjustable sheaves have their main area of applicability, namely in small, simple machine tools, in textile machinery and in packaging machinery.

In view of this, it has therefore long been a recognized need in the industry to have available an adjustable sheave which overcomes the operating disadvantages described in the introductory comments to this specification, but which achieves this without the high economical and technological expenditure known from the prior art.

Summary of the invention

The present invention overcomes the aforementioned problems inherent in adjustable sheaves and provides the desired advantages.

The sheave according to the present invention achieves its purpose with a very simple but nevertheless highly reliable construction.

As a result of the simplicity of construction of the novel sheave, the same requires only very small technological and economical expenditures.

The sheave according to the present construction is highly resistant to wear, and particularly to the type of wear described before and resulting from the continual axial motions of the movable flange caused by width-variations of an associated V-belt.

An important advantage of the present invention, in addition to those already outlined, is the fact that the novel adjustable sheave requires no precision machining, and that all components can be readily and quickly assembled.

In accordance with one feature of our invention, we provide an adjustable sheave, as already pointed out above.

This sheave comprises a shaft member and a flange which is mounted on the shaft member, and which is immovable with reference thereto. A movable flange member is also provided and is so arranged on the shaft member that it has freedom of axial movement relative thereto. The movable flange member comprises an elongated hub which surrounds a portion of the shaft member with clearance and in coaxial relationship therewith. Finally, we also provide coupling means which engages the movable flange member at least in the region of the respective axial ends of the hub and which serves for centering the hub with reference to the shaft. Concomitantly, the coupling means couples the flange member to the shaft member with freedom of axial movement relative thereto while at the same time it prevents relative rotation of the movable flange member and the shaft member in response to the transmission of torque from one to the other of these members.

It is to be understood that the coupling means can engage the movable flange member at additional points intermediate the region of the respective axial ends of the hub, but the engagement must take place at least in those regions. The coupling means comprises coupling members, still to be described hereafter, which can advantageously consist of a synthetic plastic material. One type of such material which has been found particularly suitable is available commercially under the trade name "Vulkolan."

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

Description of the preferred embodiments

Figure 1:
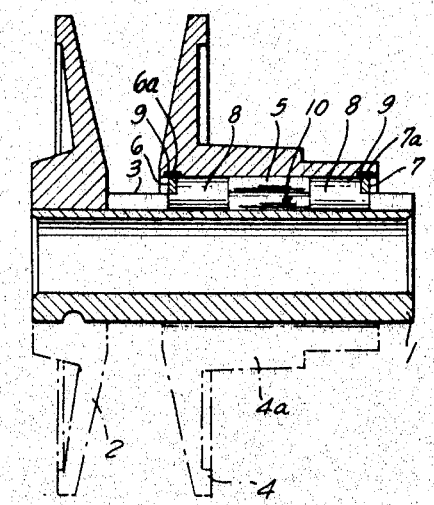
FIG. 1 is a partly sectioned axial view illustrating an adjustable sheave constructed in accordance with the present invention, with the movable flange member being shown in the upper half of the view in section, and in the lower half of the view in schematic outline only.
Figure 4:
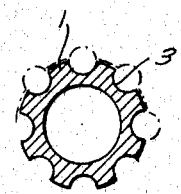
FIG. 4 is a transverse section taken through the shaft member which forms a component of the adjustable sheave illustrated in FIG. 1.

Discussing now the drawing in detail, and firstly FIG. 1 thereof, it will be seen that there is shown therein an adjustable sheave comprising an elongated shaft 1 which, in the illustrated embodiment, is hollow and which carries immovably the fixed flange 2 thereon. FIG. 4, which is a transverse section taken through the shaft 1, illustrates how the shaft 1 is provided with a plurality of axially extending concave grooves 3 which are angularly spaced about the shaft 1.

A movable flange member 4 is arranged adjacent to the fixed flange 2 and is axially movable on the shaft 1. Flange member 4 is provided with an axially extending hub 4a which surrounds the shaft 1 in coaxial relationship and with slight spacing therefrom. FIG. 1 illustrates that movable flange 4 defines with the stationary flange 2 a V-shaped groove which is adapted to receive a V-belt which latter it is not believed necessary to illustrate because it is well known to those skilled in the art. The hub 4a of the movable flange member 4 is provided with a plurality of axially extending concave grooves 5 which are complementary to the grooves 3 in the shaft 1. Thus, a groove 3 and a groove 5 together constitute an axially extending passage.

Figure 2:
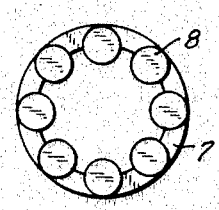
FIG. 2 is an end view of the coupling means according to the present invention.
Figure 3:
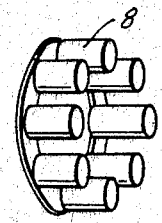
FIG. 3 is a perspective view of the embodiment shown in FIG. 2.

In accordance with the invention, we provide coupling means which is illustrated in more detail in FIGS. 2 and 3. Such coupling means comprises at least two coupling elements, of which only one is illustrated in FIGS. 2 and 3 because the other one is identical therewith, and each of these coupling elements consists of an annular carrier. In FIGS. 2 and 3, this annular carrier is identified with reference numeral 7 and in FIG. 1 where the second coupling element is also illustrated, the annular carrier of the second coupling element is identified with reference numeral 6. The inner surface of the hub 4a is provided in the embodiment illustrated in FIG. 1 at the opposite axial ends of the hub with two annular recesses 6a and 7a, respectively, and the annular carriers 6 and 7 surround the shaft 1 and extend with their radially outermost edge portions 9 into the respective annular recesses 6a and 7a by these edge portions serve not only to connect the carriers 6 and 7 to the movable flange member 4 for movement therewith, but also serve as sealing elements as will become evident hereafter.

FIGS. 1, 2 and 3 illustrate that each of the annular carriers 6, 7 carries a plurality of cylindrical motion-transmitting members 8 whose cross sectional configuration is such that each of these members 8 is received in one of the passages composed of a groove 3 and a complementary groove 5 and can slide in such passage. Evidently, the members 8 will be angularly spaced about the respective carriers 6, 7 in the same manner in which the grooves 3 are angularly spaced about the periphery of the shaft 1. Advantageously, the motion-transmitting members 8 are made from a synthetic plastic material, such as the material which is commercially available under the trade name "Vulkolan" and such material facilitates ready sliding of the members 8 in the respective passages. At the same time, material of this type has a high degree of resistance to destruction by the unavoidable friction which occurs during the axial movements of the flange 4 and the associated coupling elements.

FIG. 1 illustrates clearly that the annular carriers 6, 7 are always located closest to the respective end face of the hub 4a on the movable flange member 4. Thus, the members 8 carried by the respective annular carriers 6 and 7 extend inwardly from these respective end faces toward one another. However, they are axially spaced from one another, as shown in FIG. 1, and there exists between them an unobstructed space 10 constituted by a portion of each of the passages which are formed by respective cooperating grooves 3 and 5. In accordance with the invention, these spaces 10, which have a relatively large volumetric capacity, can receive a suitable lubricating material which is prevented from escaping by the sealing action of the respective members 8 and the edge portions 9 of the respective annular carriers 6 and 7 which act as sealing elements as already pointed out before. The provision of the relatively large quantities of lubricant in the respective spaces 10 makes it possible to operate the novel adjustable sheave in accordance with the present invention for rather long periods of time without any maintenance whatever. It is clear, of course, from FIG. 1 in particular, that the members 8 not only serve for sealing purposes and as motion-transmitting members via which torque can be transmitted from the shaft 1 to the movable flange member 4, or vice versa, but also act to reliably and automatically center the hub of the movable flange member 4 with reference to the shaft 1. This makes it possible to forego the precise machining of the external surface of the shaft 1 and the internal surface of the hub 4a which would otherwise be necessary and which would add to the cost of manufacturing and selling the arrangement. In fact, the entire arrangement is very simple and inexpensive to manufacture because the grooves 3 can be drawn and the grooves 5 be provided by material removal, and the entire arrangement, aside from the respective carriers 6, 7 and the associated members 8, consists only of three parts, namely the shaft 1, the fixed flange 2 and the movable flange member 4. All of these parts can be drawn and cast without requiring any further treatment, thus eliminating the heretofore necessary prevision treatment of the various parts and significantly reducing the manufacturing and selling cost.

It will be evident from what has been said before, as well as from a consideration of FIG. 1, that no material will be removed in form of minute particles from either the shaft 1 or the movable flange member 4 as a result of friction between the two because neither of these two members comes in direct contact with the other. Thus, the only material removal as a result of friction can take place on the associated V-belt, and to such loosened particles from this belt come moisture and contaminants in the ambient atmosphere. However, the intrusion of all such contaminants into contact with surfaces which are slidable relative to one another is largely precluded by the sealing action of the edge portions 9 of the respective annular carriers 6 and 7.

It is to be understood, of course, that the provision of two of the coupling elements such as illustrated in FIGS. 2 and 3, namely the elements consisting of the respective annular carriers 6 or 7 and the associate members 8 is by way of illustration only and that more than two of such elements can be provided. This can depend on various factors, for instance on the axial length of the hub 4a of the movable flange member, but the provision of additional ones of such elements will not effect the concept of the invetnion as disclosed herein.

It will be understood that each of the elements described above, or two or more together, may also find a useful application in other types of arrangements differing from the types described above.

While the invention has been illustrated and described as embodied in an adjustable sheave, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. An adjustable sheave comprising, in combination, a shaft member; a flange mounted on said shaft member; a movable flange member arranged on said shaft member with freedom of axial movement relative thereto and comprising an elongated hub surrounding a portion of said shaft member coaxially and with clearance; and first and second means engaging said movable flange member at least in the region of both axial ends of said hub, said first and second means both being operative for centering and guiding the hub for movement with reference to said shaft member while maintaining said clearance and for concomitantly coupling said flange member to said shaft member with freedom of axial movement relative thereto while preventing relative rotation of said members in response to the transmission of torque from one to the other of said members.

2. A sheave as defined in claim 1, wherein said shaft member has an exterior surface and said hub has an interior surface, both of said surfaces being provided with axially extending complementary grooves; and wherein said means comprises at least two units spaced in axial direction of said hub and each including a carrier member and a plurality of motion-transmitting members carried by said carrier member and received in respective complementary grooves.

3. A sheave as defined in claim 2, wherein said motion-transmitting members are of cylindrical configuration and said grooves are of concave cross-section.

4. A sheave as defined in claim 2, wherein said motion-transmitting members are made from synthetic plastic material.

5. A sheave as defined in claim 2, wherein said motion-transmitting members center said hub with reference to said shaft member.

6. A sheave as defined in claim 2, wherein said grooves are angularly spaced about said shaft member and said hub, respectively.

7. A sheave as defined in claim 2, wherein said carrier members are of annular configuration and surround said shaft member.

8. A sheave as defined in claim 7, wherein said annular carrier members are of synthetic plastic material.

9. A sheave as defined in claim 7, wherein said annular carrier members and said motion-transmitting members are of synthetic plastic material.

10. A sheave as defined in claim 7, said inner surface of said hub being provided in the region of the respective axial ends of said hub with a circumferential recess, and the respective annular carrier members having radially outer circumferential edge portions received in the respective recess.

11. A sheave as defined in claim 10, wherein the motion-transmitting members of the respective units extend in axial direction of said shaft member toward but short of one another and define intermediate each other respective spaces each adapted to receive a quantity of lubricant, said circumferential edge portions of said annular carrier members received in the respective recess serving to prevent escape of such lubricant from said spaces.

12. A sheave as defined in claim 2, wherein the motion-transmitting members of the respective units extend in axial direction of said shaft member toward but short of one another and define intermediate each other respective spaces each adapted to receive a quantity of lubricant.

References Cited

UNITED STATES PATENTS 3,358,520   12/1967   Heydlauf et al.

FRED C. MATTERN, JR., *Primary Examiner.*

JAMES A. WONG, *Assistant Examiner.*